United States Patent
Nelson et al.

(10) Patent No.: US 12,424,908 B2
(45) Date of Patent: Sep. 23, 2025

(54) ELECTRIC DRIVE UNIT HAVING A HEAT EXCHANGER

(71) Applicant: Schaeffler Technologies AG & Co. KG, Herzogenaurach (DE)

(72) Inventors: Kyle Nelson, Wadsworth, OH (US); Antonio Eduardo Mogro Zambrano, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 300 days.

(21) Appl. No.: 18/177,236

(22) Filed: Mar. 2, 2023

(65) Prior Publication Data

US 2023/0387755 A1 Nov. 30, 2023

Related U.S. Application Data

(60) Provisional application No. 63/428,673, filed on Nov. 29, 2022, provisional application No. 63/346,176, filed on May 26, 2022.

(51) Int. Cl.
*H02K 9/197* (2006.01)
*H02K 5/15* (2006.01)

(52) U.S. Cl.
CPC .............. *H02K 9/197* (2013.01); *H02K 5/15* (2013.01)

(58) Field of Classification Search
CPC ............ H02K 9/00; H02K 9/197; H02K 9/19; H02K 5/15; H02K 9/12
USPC .................... 310/52, 54, 58–59, 64
See application file for complete search history.

(56) References Cited

U.S. PATENT DOCUMENTS

| | | | |
|---|---|---|---|
| 2004/0124722 A1 * | 7/2004 | Uchida | B60L 50/16 903/952 |
| 2005/0168081 A1 | 8/2005 | Takenaka et al. | |
| 2010/0072865 A1 | 3/2010 | Endo et al. | |
| 2019/0157922 A1 * | 5/2019 | Tangudu | H02K 1/146 |

FOREIGN PATENT DOCUMENTS

| | | | |
|---|---|---|---|
| JP | 2019154208 A | * | 9/2019 |
| JP | 2020162338 A | | 10/2020 |

* cited by examiner

*Primary Examiner* — Jose A Gonzalez Quinones
(74) *Attorney, Agent, or Firm* — Price Heneveld LLP

(57) ABSTRACT

An electric drive unit includes an electric motor and a housing that houses the electric motor. The housing includes a heat exchanging wall portion that includes an inner surface that defines a fluid jacket cavity for conveying a first fluid and an outer surface that is opposite the inner surface and that defines a fluid chamber for conveying a second fluid. The heat is transferred between the first and second fluids through the heat exchanging wall portion.

18 Claims, 14 Drawing Sheets

ELECTRIC DRIVE UNIT HAVING A HEAT EXCHANGER

CROSS-REFERENCE TO RELATED APPLICATIONS

This application claims the benefit of priority under 35 U.S.C. § 119 of U.S. Provisional Application No. 63/428,673, filed on Nov. 29, 2022, and U.S. Provisional Application No. 63/346,176, filed on May 26, 2022, the entire contents of which are incorporated herein by reference.

FIELD OF THE DISCLOSURE

The present disclosure relates generally to an electric drive unit. More specifically, the present disclosure relates to a heat exchanger of an electric drive unit.

BACKGROUND OF THE DISCLOSURE

In general, e-axles are intended for the smallest vehicle installation spaces. Heat dissipation out of e-axles is increasingly important because of the power density that e-axles achieve. For example, e-axles utilizing an asynchronous induction motor typically require active rotor cooling for function. As such, it is desirable to provide a way to accomplish the performance goals for cooling without adding significant costs, components, and complexity to the assembly.

SUMMARY OF THE DISCLOSURE

According to a first aspect of the present disclosure, an electric drive unit includes an electric motor and a housing that houses the electric motor. The housing includes a heat exchanging wall portion that includes an inner surface that defines a fluid jacket cavity for conveying a first fluid and an outer surface that is opposite the inner surface and that defines a fluid chamber for conveying a second fluid. The heat is transferred between the first and second fluids through the heat exchanging wall portion.

Embodiments of the first aspect of the disclosure can include any one or a combination of the following features:
  the inner surface of the heat exchanging wall portion is axially and circumferentially aligned with the outer surface of the heat exchanging wall portion;
  the electric motor includes a rotor and a stator positioned radially outboard of the rotor, and wherein the stator is axially aligned with the heat exchanging wall portion of the housing;
  the fluid jacket cavity is defined by the inner surface of the heat exchanging wall portion and a stator carrier, wherein a portion of the stator carrier is axially aligned with and positioned radially outboard of the stator;
  the first fluid comprises water and the second fluid is oil;
  heat is transferred to the first fluid from the second fluid through the heat exchanging wall portion;
  the outer surface of the heat exchanging wall portion forms a base and a plurality of protrusions extending radially outboard from the base;
  a cover is mounted to the housing and arranged radially outboard of the heat exchanging wall portion, such that the outer surface of the heat exchanging wall portion and the cover cooperate to define the fluid chamber;
  the cover includes a plurality of protrusions that extend radially inboard toward the outer surface of the heat exchanging wall portion of the housing;
  the plurality of protrusions of the cover are aligned with the plurality of protrusions of the outer surface of the heat exchanging wall portion, such that distal ends of the plurality of protrusions of the cover face distal ends of the plurality of protrusions of the outer surface of the heat exchanging wall portion;
  the outer surface of the heat exchanging wall portion further forms a baffle that extends radially outboard from the base further than the plurality of protrusions of the outer surface of the heat exchanging wall portion extend radially outboard from the base;
  the cover includes a baffle that extends radially inboard along the baffle formed by the outer surface of the heat exchanging wall portion; and
  the plurality of protrusions extending radially outboard from the base includes a first protrusion having a height that the first protrusion extends outward from the base to a distal end of the first protrusion, a width, and a length that is greater than the width of the first protrusion such that the first protrusion is elongated in the lengthwise direction of the first protrusion, and a second protrusion having a height that the second protrusion extends outward from the base to a distal end of the second protrusion, a width, and a length that is greater than the width of the second protrusion such that the second protrusion is elongated in the lengthwise direction of the second protrusion, wherein the first and second protrusions are oriented such that an angular difference between the lengthwise directions of the first and second protrusions is greater than an angular difference between the heightwise directions of the first and second protrusions.

According to a second aspect of the present disclosure, an electric drive unit includes a body having a surface that defines a fluid chamber. The surface forms a base and a plurality of protrusions extending outward from the base within the fluid chamber. The plurality of protrusions include a first protrusion having a height that the first protrusion extends outward from the base to a distal end of the first protrusion, a width, and a length that is greater than the width of the first protrusion such that the first protrusion is elongated in the lengthwise direction of the first protrusion. The plurality of protrusions further include a second protrusion having a height that the second protrusion extends outward from the base to a distal end of the second protrusion, a width, and a length that is greater than the width of the second protrusion such that the second protrusion is elongated in the lengthwise direction of the second protrusion. The first and second protrusions are oriented such that an angular difference between the lengthwise directions of the first and second protrusions is greater than an angular difference between the heightwise directions of the first and second protrusions.

Embodiments of the second aspect of the disclosure can include any one or a combination of the following features:
  the body is a housing that houses an electric motor, and the surface is an outer surface of a heat exchanging wall portion of the housing;
  the heat exchanging wall portion includes an inner surface opposite the outer surface, wherein the inner surface defines a fluid jacket cavity;
  the heat exchanging wall portion is configured to transfer heat to a first fluid that is conveyed within the fluid jacket cavity from a second fluid that is conveyed within the fluid chamber;

the body is a cover coupled to a housing that houses an electric motor, wherein the cover and the housing define the fluid chamber; and the plurality of protrusions further includes a third protrusion having a height that the third protrusion extends outward from the base to a distal end of the third protrusion, a width, and a length that is greater than the width of the third protrusion such that the third protrusion is elongated in the lengthwise direction of the third protrusion, wherein the third protrusion is oriented such that an angular difference between the lengthwise directions of the first and third protrusions is greater than an angular difference between the heightwise directions of the first and third protrusions, an angular difference between the lengthwise directions of the second and third protrusions is greater than an angular difference between the heightwise directions of the second and third protrusions, and the angular difference between the lengthwise directions of the first and third protrusions is greater than the angular difference between the lengthwise directions of the second and third protrusions.

According to a third aspect of the present disclosure, an electric drive unit includes an electric motor, a housing that houses the electric motor and includes an outer surface that forms a base and a plurality of protrusions that extend radially outboard from the base, and a cover coupled to the housing and having a plurality of protrusions that are aligned with the plurality of protrusions of the outer surface of the housing. The outer surface of the housing and the cover cooperate to define a fluid chamber for conveying fluid.

These and other features, advantages, and objects of the present disclosure will be further understood and appreciated by those skilled in the art by reference to the following specification, claims, and appended drawings.

DETAILED DESCRIPTION

Figure 1:
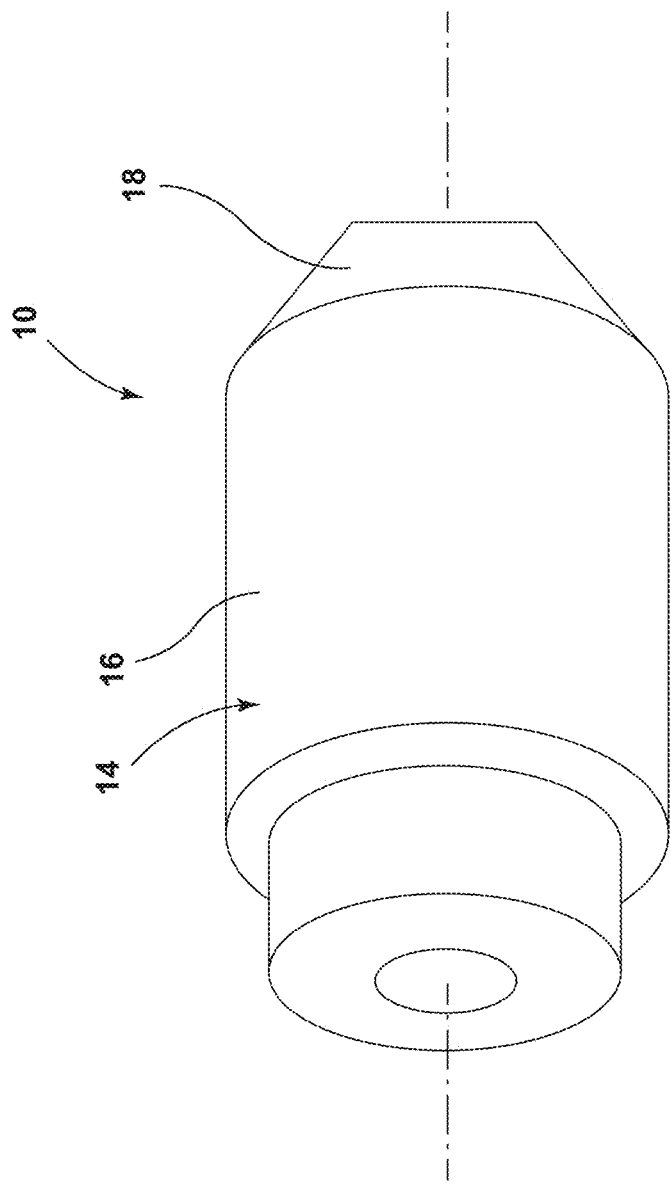
FIG. 1 is a top perspective view of an electric drive unit that includes a housing.
Figure 2:
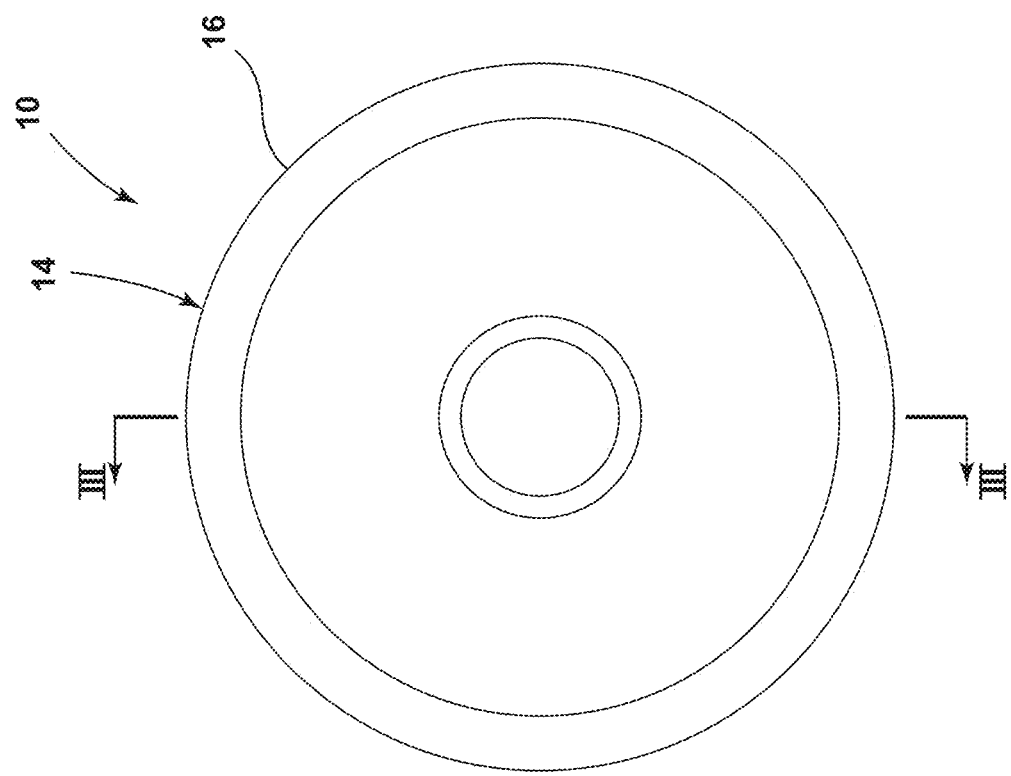
FIG. 2 is a side elevational view of the electric drive unit.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate about the axis in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis. The term "circumferential" and derivatives thereof, such as "circumferentially," shall be understood in relation to the axis of the aforementioned rotor shaft.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices, or materials similar or equivalent to those described herein can be used in the practice or testing of the disclosure, the following example methods, devices, and materials are now described.

Embodiments according to this disclosure provide for active rotor cooling without significant cost adds to the assembly such as a typical stack plate heat exchanger and oil pumps. A heat exchanger is integrated within an existing component and also utilizes the existing electric motor stator fluid jacket to also serve as a direct oil-water heat exchanger without added water circuits, which is especially important in this case for an auxiliary drive unit which is only active in intermittent times in a vehicle.

The stator fluid jacket is therefore used to not only pull heat from the stator laminations, but also to pull heat from the oil for rotor cooling. The heat exchange from oil to water is facilitated by creating a fluid chamber (e.g., oil chamber) integral to the center housing casting arranged around a wall of the stator fluid jacket which oil is delivered into. Oil exchanges heat with the fluid within the fluid jacket cavity, and cooled oil is fed to the rotor shaft.

Heat extraction from the heat exchanger relies on the presence of oil flow rate, the amount of flow rate, the fluid dynamics, and the time oil remains in the heat extraction zone. The heat exchanger geometry has an impact on pressure and therefore on the oil flow rate. Since the electric drive unit does not employ an oil pump, flow rate decreases as pressure decreases. The heat exchanger geometry also has an impact in fluid dynamics. Generally, the more turbulent the flow of fluid is, the higher the thermal transfer and pressure reductions are. The heat transfer also depends on the wet surface area of the heat exchanger. Greater wet surface area results in greater heat transfer. The heat exchanger geometry also has an impact in the time the oil remains in the heat extraction zone. The more restrictive the heat exchanger, the more time oil remains in the heat extraction zone and pressure is reduced. The heat exchanger extracts heat through conduction and convection. Material along with the surface area and the thickness have major impacts on heat transfer. High oil flow allows for better heat extraction through convection without substantially increasing the temperature of oil returning the gearbox. Low oil flow increases the time oil remains inside the zones of heat extraction, which increases heat extraction through conduction. No oil flow would result in overheating of the system.

According to embodiments disclosed herein, a heat exchanger assembly is provided that causes relatively low reductions in fluid pressure (and hence less restrictive to oil flow), greater turbulence (without substantially decreasing pressure), greater surface area (through protrusions and/or baffles), and oil to remain in the heat extraction zone for longer (without substantially decreasing pressure). In this way, the embodiments disclosed herein provide a heat exchanger assembly that achieves good thermal performance.

Figure 3:
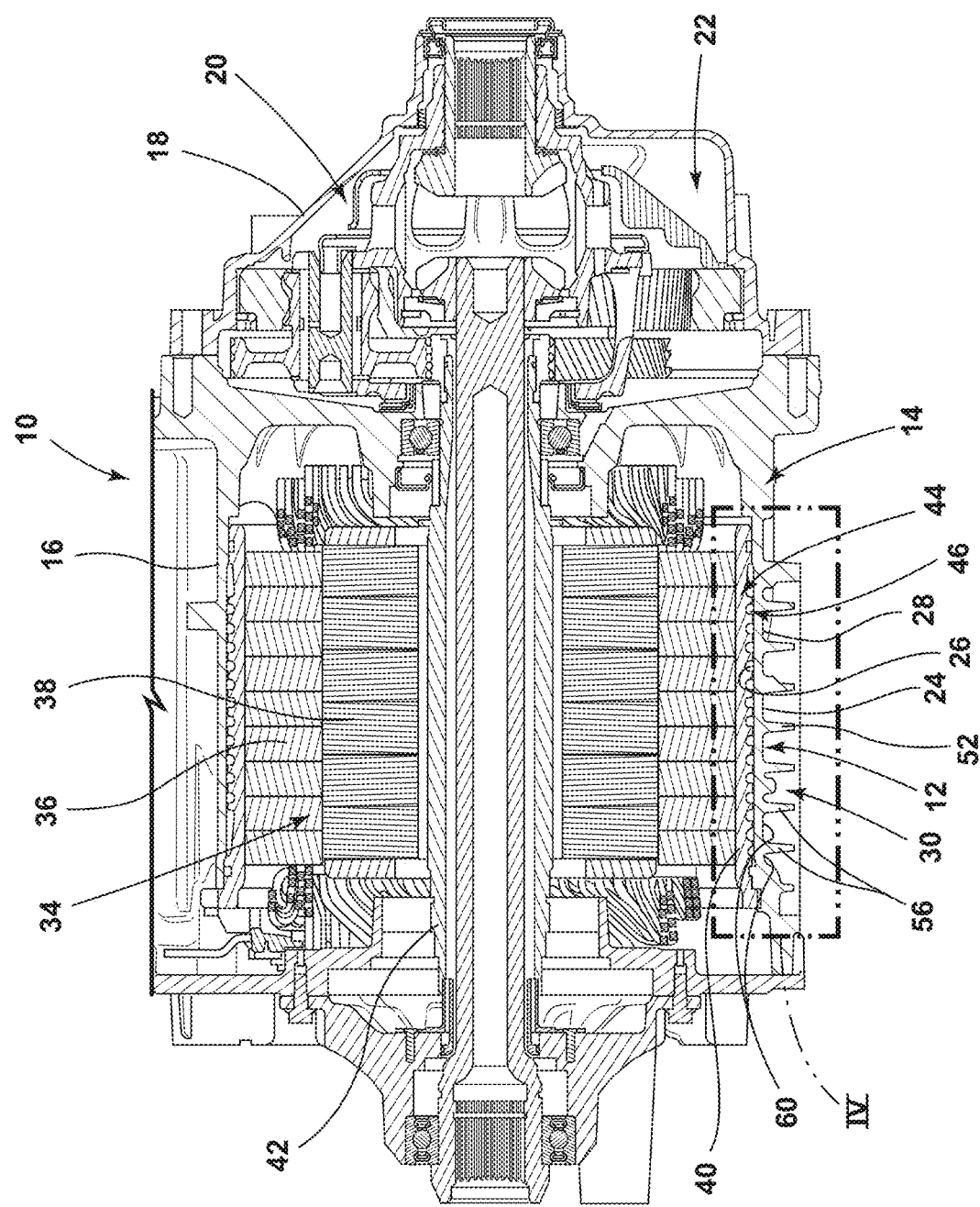
FIG. 3 is a cross-sectional view of the electric drive unit of FIG. 2 taken at line III-III illustrating a heat exchanger and a heat exchanging wall portion of the housing of the electric drive unit.

Referring now to FIGS. 1-4, an electric drive unit 10 for a vehicle having a heat exchanger 12 is provided, wherein the electric drive unit 10 is designed as an electric axle ("e-axle"). The electric drive unit 10 has a housing 14. The housing 14 can be functionally divided into a motor or center housing region 16 and a gear or gearbox housing region 18. In some embodiments, the housing 14 may be designed as a die-cast aluminum housing and may be formed in multiple parts. A gearbox 20 may include a planetary gearset, a differential, and a sump 22, for example. A heat exchanger 12 can be integrated, or integral with, the housing 14. That is, the existing planned casting process for the housing 14 may be used to form at least a portion of the heat exchanger 12. In some embodiments, the heat exchanger 12 can be integrated, or integral with, the center housing region 16. The housing 14 can include a heat exchanging wall portion 24 that forms a portion of the heat exchanger 12, as described further herein. In some embodiments, the heat exchanger 12 may be located on the bottom of the electric drive unit 10, as illustrated in FIG. 3. In some embodiments, the heat exchanger 12 may be located in another location, for example, on the top of the electric drive unit 10.

Figure 4:
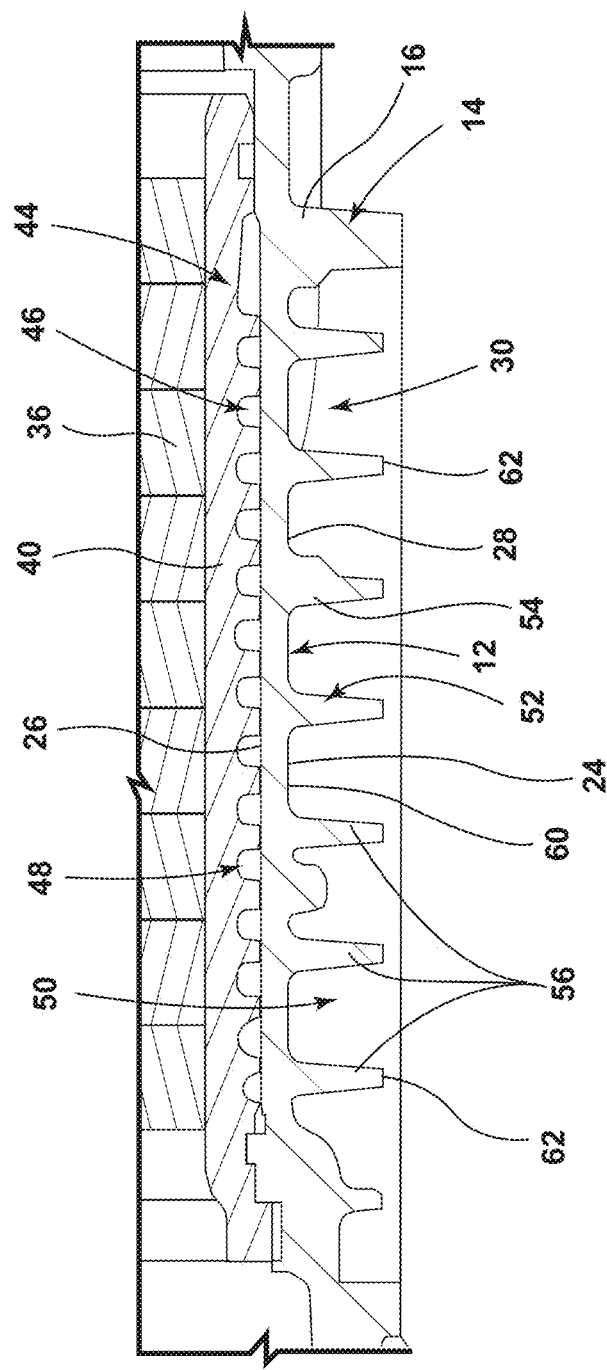
FIG. 4 is an enlarged view of the area IV of FIG. 3 illustrating the heat exchanger and the heat exchanging wall portion of the housing of the electric drive unit.
Figure 5:
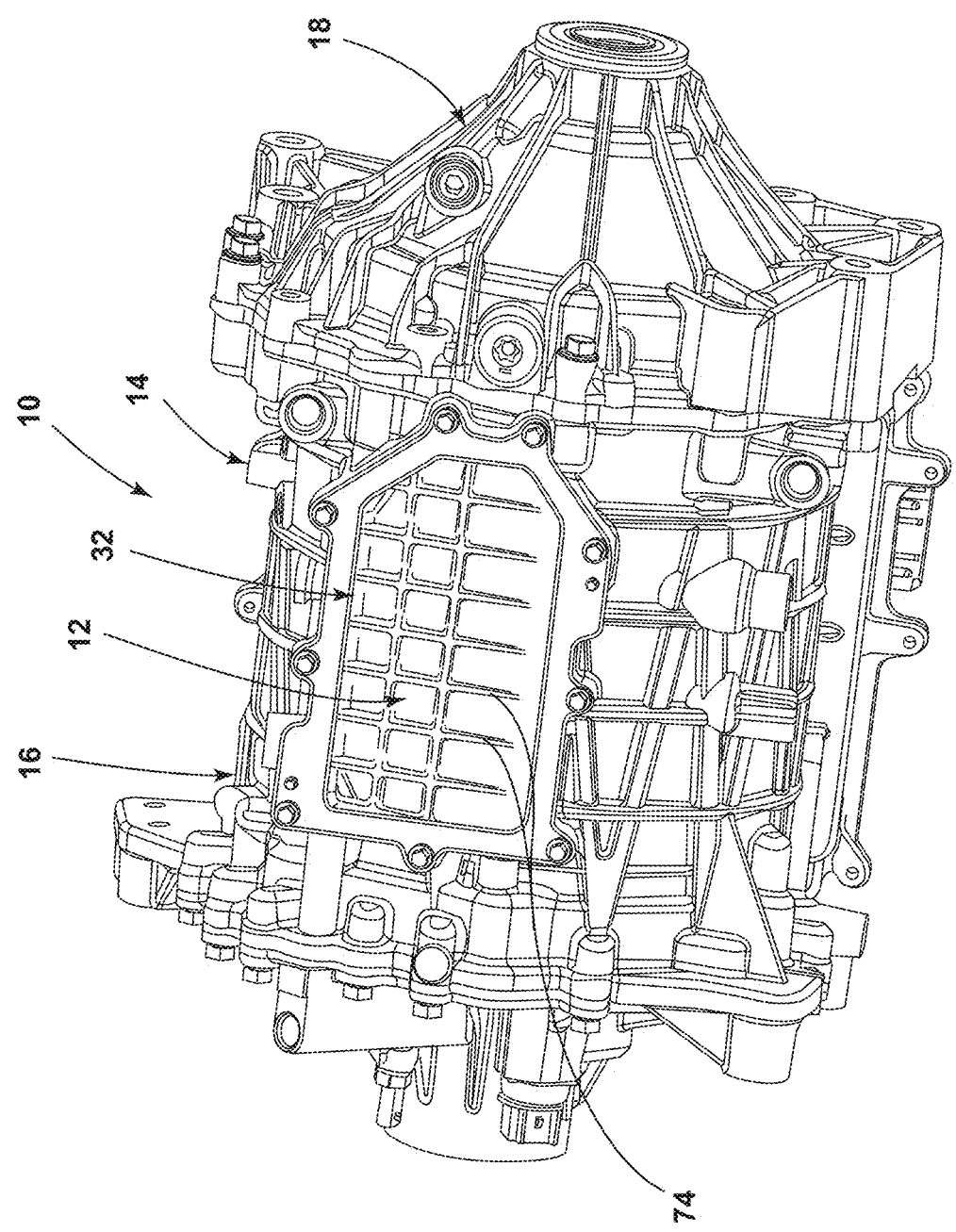
FIG. 5 is a perspective view of an electric drive unit that includes a cover coupled to a housing of the electric drive unit.
Figure 6:
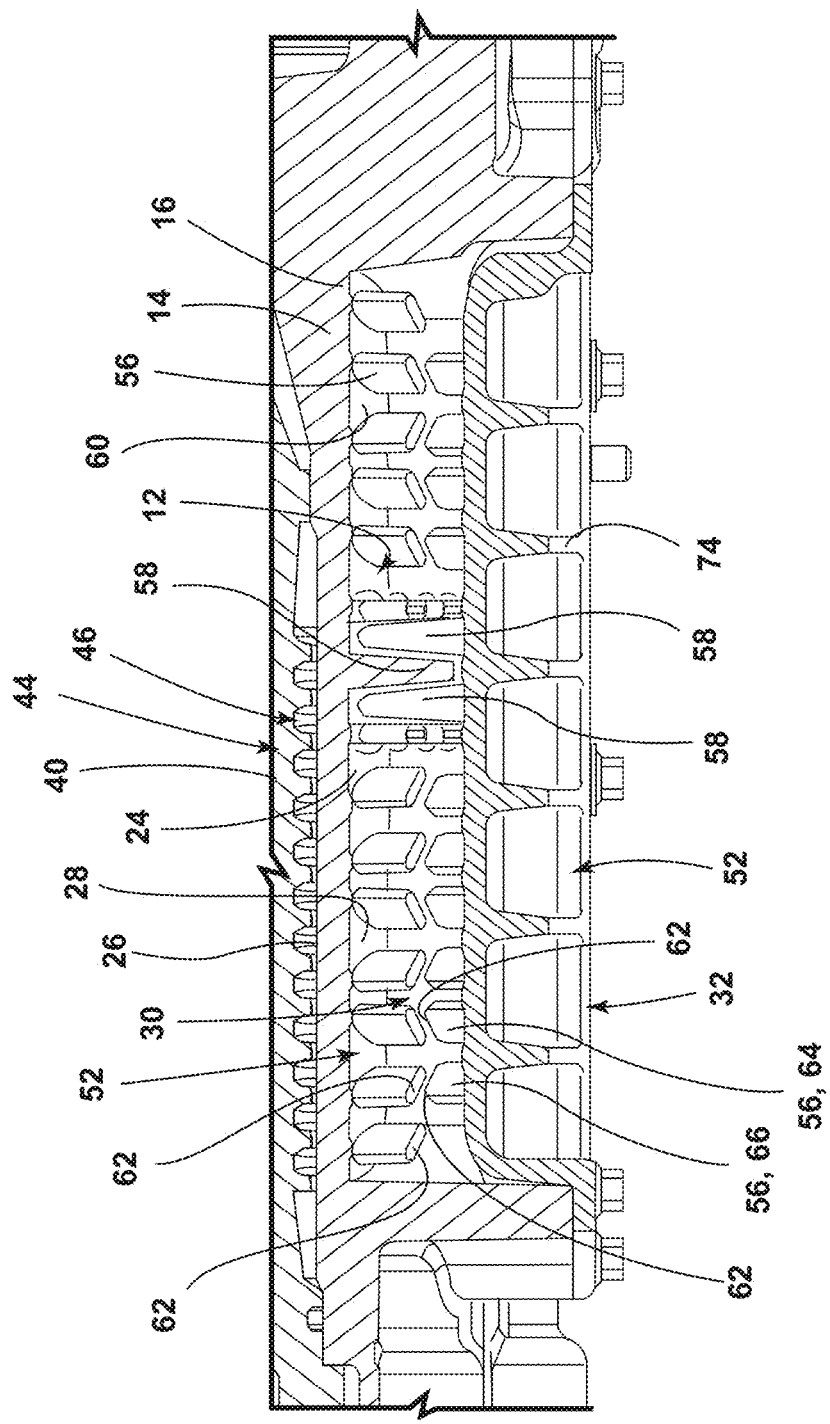
FIG. 6 is a cross-sectional view of a portion of the electric drive unit of FIG. 5 illustrating the cover and a heat exchanging wall portion of the housing that defines a fluid chamber.

Referring now to FIGS. 1-6, the housing 14 includes an inner surface 26 and an outer surface 28 opposite the inner surface 26. As illustrated in FIG. 3, the outer surface 28 of the center housing region 16 of the housing 14 is radially outboard of the inner surface 26 of the center housing region 16. A fluid chamber 30 of the heat exchanger 12 may be defined by the outer surface 28 of a portion of the housing 14, such as the outer surface 28 of a portion of the center housing region 16 of the housing 14. As illustrated in FIGS. 3 and 4, the fluid chamber 30 is defined by the outer surface 28 of the heat exchanging wall portion 24 of the housing 14. In some embodiments, a cover 32 is mounted to the housing 14. For example, in the embodiment illustrated in FIGS. 5 and 6, the cover 32 is mounted to the outer surface 28 of the center housing region 16 of the housing 14 and is arranged radially outboard of the heat exchanging wall portion 24 of the housing 14. In the embodiment illustrated in FIG. 5, the cover 32 is mounted to the outer surface 28 of the center housing region 16 of the housing 14. The outer surface 28 of the heat exchanging wall portion 24 of the housing 14 and the cover 32 can cooperate to define the fluid chamber 30, as illustrated in FIG. 6. The fluid chamber 30 is configured to convey fluid in operation of the electric drive unit 10, as described further herein.

Referring still to FIGS. 1-6, the electric drive unit 10 includes an electric motor 34 having a stator 36, a rotor 38, a stator carrier 40, and a rotor shaft 42. The stator 36 is positioned radially outboard of the rotor 38. The housing 14 houses the electric motor 34, as illustrated in FIG. 3. A fluid jacket 44 is formed and bounded by the stator carrier 40 and a portion of the housing 14. In various embodiments, the fluid jacket 44 is formed and bounded by the stator carrier 40 and the inner surface 26 of the center housing region 16 of the housing 14. As illustrated in FIGS. 3 and 4, the inner surface 26 of the heat exchanging wall portion 24 of the housing 14 forms a portion of the fluid jacket 44. The fluid jacket 44 defines a fluid jacket cavity 46 that is configured to convey fluid, as described further herein. In the embodiment illustrated in FIG. 3, the inner surface 26 of a portion of the housing 14 including the inner surface 26 of the heat exchanging wall portion 24 of the housing 14 and the stator carrier 40 define the fluid jacket cavity 46.

The fluid jacket cavity 46 may be filled with a first fluid 48, such as a water-glycol mixture, for example, for cooling of the stator 36. A second fluid 50, such as oil, is disposed within the fluid chamber 30 of the heat exchanger 12 defined by the outer surface 28 of the heat exchanging wall portion 24 of the housing 14. Heat is transferred between the first and second fluids 48, 50 through the heat exchanging wall portion 24 of the housing 14. In operation of an exemplary embodiment of the electric drive unit 10, wherein the first fluid 48 comprises water (e.g., a water-glycol mixture) and the second fluid 50 is oil, the heat exchanger 12 functions via heat being transferred to the first fluid 48 from the second fluid 50 through the heat exchanging wall portion 24. In such embodiments, the fluid within the fluid chamber 30 is cooled. This arrangement may advantageously allow for heat exchange between the first and second fluids 48, 50 without added fluid pressure losses or the addition of additional fluid circuits. It is contemplated that a variety of different types of fluids can be utilized as the first fluid 48 within the fluid jacket cavity 46 and the second fluid 50 within the fluid chamber 30. As illustrated in FIG. 3, in various embodiments, the inner surface 26 of the heat exchanging wall portion 24 is axially and circumferentially aligned with the outer surface 28 of the heat exchanging wall portion 24, the stator 36 is axially aligned with the heat exchanging wall portion 24 of the housing 14, and a portion of the stator carrier 40 is axially aligned with and positioned radially outboard of the stator 36.

Referring now to FIGS. 4-13, the electric drive unit 10 can include a body 52. In some embodiments, the electric drive unit 10 includes a plurality of bodies 52. The body 52 includes a surface 54 that defines the fluid chamber 30. In some embodiments, the body 52 is the housing 14 that houses the electric motor 34, and the surface that defines the fluid chamber 30 is the outer surface 28 of the heat exchanging wall portion 24 of the housing 14. In some embodiments, the body 52 is the cover 32 that is coupled to the housing 14, and the cover 32 and the housing 14 define the fluid chamber 30. The surface 54 of the body 52 that defines the fluid chamber 30 can include a protrusion 56 and/or a baffle 58. In various embodiments, the surface 54 of the body 52 that defines the fluid chamber 30 includes a plurality of protrusions 56 and/or a plurality of baffles 58.

Referring now to FIGS. 3, 4, 6-8, and 10-13, the body 52, in the form of the heat exchanging wall portion 24 of the housing 14, is illustrated. In various embodiments, the outer surface 28 of the heat exchanging wall portion 24 of the housing 14 that defines the fluid chamber forms a base 60 and a plurality of protrusions 56 extending outward from the base 60. As illustrated in FIG. 6, the plurality of protrusions 56 extend outward from the base 60 of the outer surface 28 of the heat exchanging wall portion 24 to distal ends 62 of the plurality of protrusions 56. In various embodiments, the plurality of protrusions 56 extends radially outboard from the base 60 of the outer surface 28 of the heat exchanging wall portion 24, as illustrated exemplarily in FIGS. 3, 4, and 6.

Figure 7:
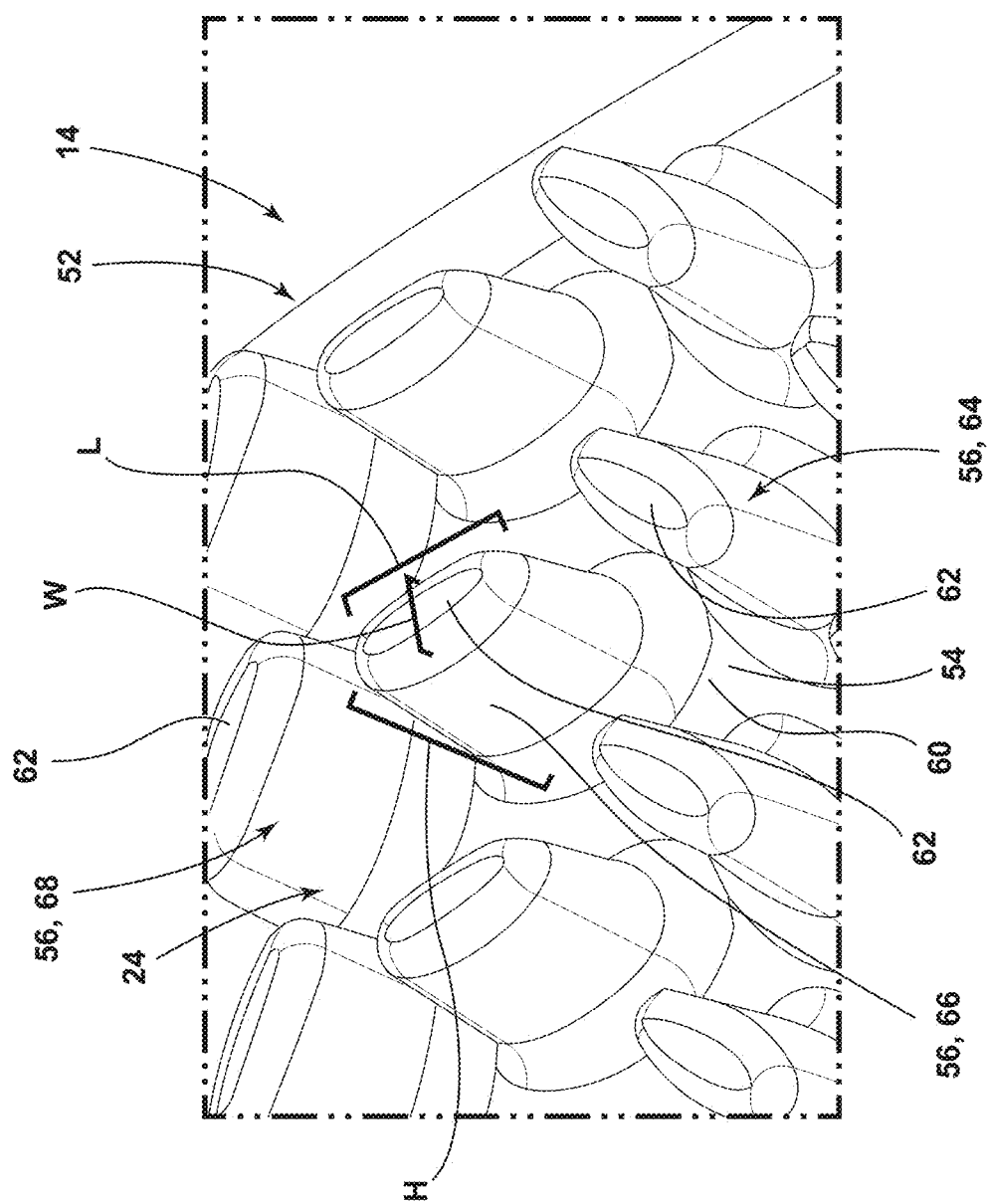
FIG. 7 is an enlarged perspective view of a portion of a body of the electric drive unit illustrating a plurality of protrusions extending outward from a base of a surface of the body.

A given protrusion 56 of the plurality of protrusions 56 that extend radially outboard from the base 60 of the outer surface 28 of the heat exchanging wall portion 24 may have a height that the protrusion 56 extends outward from the base 60 to the distal end 62 of the protrusion 56, a width, and a length. The length is greater than the width of the protrusion 56, such that the protrusion 56 is elongated in a lengthwise direction of the protrusion 56, as illustrated in FIG. 7. In an exemplary embodiment, the height of the protrusion 56 or fin is about 8 mm, the width of the protrusion 56 is about 3 mm, and the length of the protrusion 56 is about 6 mm. In various embodiments, each of the plurality of protrusions 56 may have substantially identical dimensions, as illustrated in FIG. 7. The height, width, and length of a single protrusion 56 in FIG. 7 are labeled "H," "W," and "L," respectively.

Referring now to FIG. 7, the protrusions 56 formed by the outer surface 28 of the heat exchanging wall portion 24 of the housing 14 can be oriented relative to each other such that the lengthwise directions of the protrusions 56 vary relative to each other. The variance in the lengthwise directions of the protrusions 56 may advantageously influence the flow of fluid within the fluid chamber 30. In an exemplary embodiment illustrated in FIG. 7, the plurality of protrusions 56 that extend radially outboard from the base 60 includes a first protrusion 64 and a second protrusion 66. The first protrusion 64 has a height that the first protrusion 64 extends outward from the base 60 to the distal end 62 of the first protrusion 64, a width, and a length that is greater than the width of the first protrusion 64 such that the first protrusion 64 is elongated in the lengthwise direction of the first protrusion 64. The second protrusion 66 has a height that the second protrusion 66 extends outward from the base 60 to the distal end 62 of the second protrusion 66, a width, and a length that is greater than the width of the second protrusion 66 such that the second protrusion 66 is elongated in the lengthwise direction of the second protrusion 66. As illustrated in FIG. 7, the first and second protrusions 64, 66 are oriented such that an angular difference between the lengthwise directions of the first and second protrusions 64, 66 is greater than an angular difference between the heightwise directions of the first and second protrusions 64, 66.

The plurality of protrusions 56 that extend radially outboard from the base 60 in the embodiment illustrated in FIG. 7 further includes a third protrusion 68. The third protrusion 68 has a height that the third protrusion 68 extends outward from the base 60 to the distal end 62 of the third protrusion 68, a width, and a length that is greater than the width of the third protrusion 68 such that the third protrusion 68 is elongated in the lengthwise direction of the third protrusion 68. As illustrated in FIG. 7, the third protrusion 68 is oriented such that an angular difference between the lengthwise directions of the first and third protrusions 64, 68 is greater than an angular difference between the heightwise directions of the first and third protrusions 64, 68, and an angular difference between the lengthwise directions of the second and third protrusions 66, 68 is greater than an angular difference between the heightwise directions of the second and third protrusions 66, 68. Further, the angular difference between the lengthwise directions of the first and third protrusions 64, 68 is greater than the angular difference between the lengthwise directions of the second and third protrusions 66, 68.

Referring now to FIGS. 6, 8, and 10-13, in various embodiments, the outer surface 28 of the heat exchanging wall portion 24 of the housing 14 that defines the fluid chamber 30 forms one or more baffles 58 that extend radially outboard from the base 60. The one or more baffles 58 can extend outboard from the base 60 further than the plurality of protrusions 56 extend outward from the base 60, as illustrated in FIG. 6. In the embodiment illustrated in FIG. 8, a plurality of baffles 58 extend radially outboard from the base 60.

Referring now to FIGS. 6-8 and 10-13, the presence of one or more baffles 58 and/or the angular differences between the lengthwise directions of the protrusions 56 may advantageously influence the rate and direction of the flow of fluid within the fluid chamber 30. In the embodiment illustrated in FIG. 8, fluid is configured to enter the fluid chamber 30 proximate to the upper right corner of the outer surface 28 of the heat exchanging wall portion 24 and exit the fluid chamber 30 proximate to the upper left corner of the outer surface 28 of the heat exchanging wall portion 24 (from the perspective of the viewer of FIG. 8). The baffles 58 define a serpentine flow path 70 that the fluid is guided along upon entering the fluid chamber 30. The plurality of protrusions 56 are disposed within the serpentine flow path 70 and are oriented variably with respect to the angles of their lengthwise directions. The angular differences between the lengthwise directions of the protrusions 56 may create turbulence and cause the fluid to flow back and forth in different directions within the broader serpentine flow path 70.

Alternative baffle and protrusion placements are illustrated in FIGS. 10-13. In the illustrated embodiments, the baffle 58 defines a generally U-shaped flow path 72 for the fluid to flow through the fluid chamber 30. The lengthwise directions of the protrusions 56 of each of the embodiments illustrated in FIGS. 10-13 are configured to influence the flow fluid through the fluid chamber 30 by encouraging the fluid to flow in a U-shaped direction along the generally U-shaped flow path 72 (FIG. 10), discouraging fluid from flowing in a U-shaped direction along the generally U-shaped flow path 72 (FIG. 11), or causing serpentine flow of the fluid along the generally U-shaped flow path 72 to greater (FIG. 12) or lesser (FIG. 13) degrees.

The protrusions 56 formed by the outer surface 28 of the heat exchanging wall portion 24 of the housing 14 may additionally increase the area of the outer surface 28 that comes into contact with fluid flowing within the fluid chamber 30, which may improve heat transfer from the fluid to the heat exchanging wall portion 24. The housing 14 along with the protrusions 56 may be integrally formed from, for example, die casting without machining.

Figure 8:
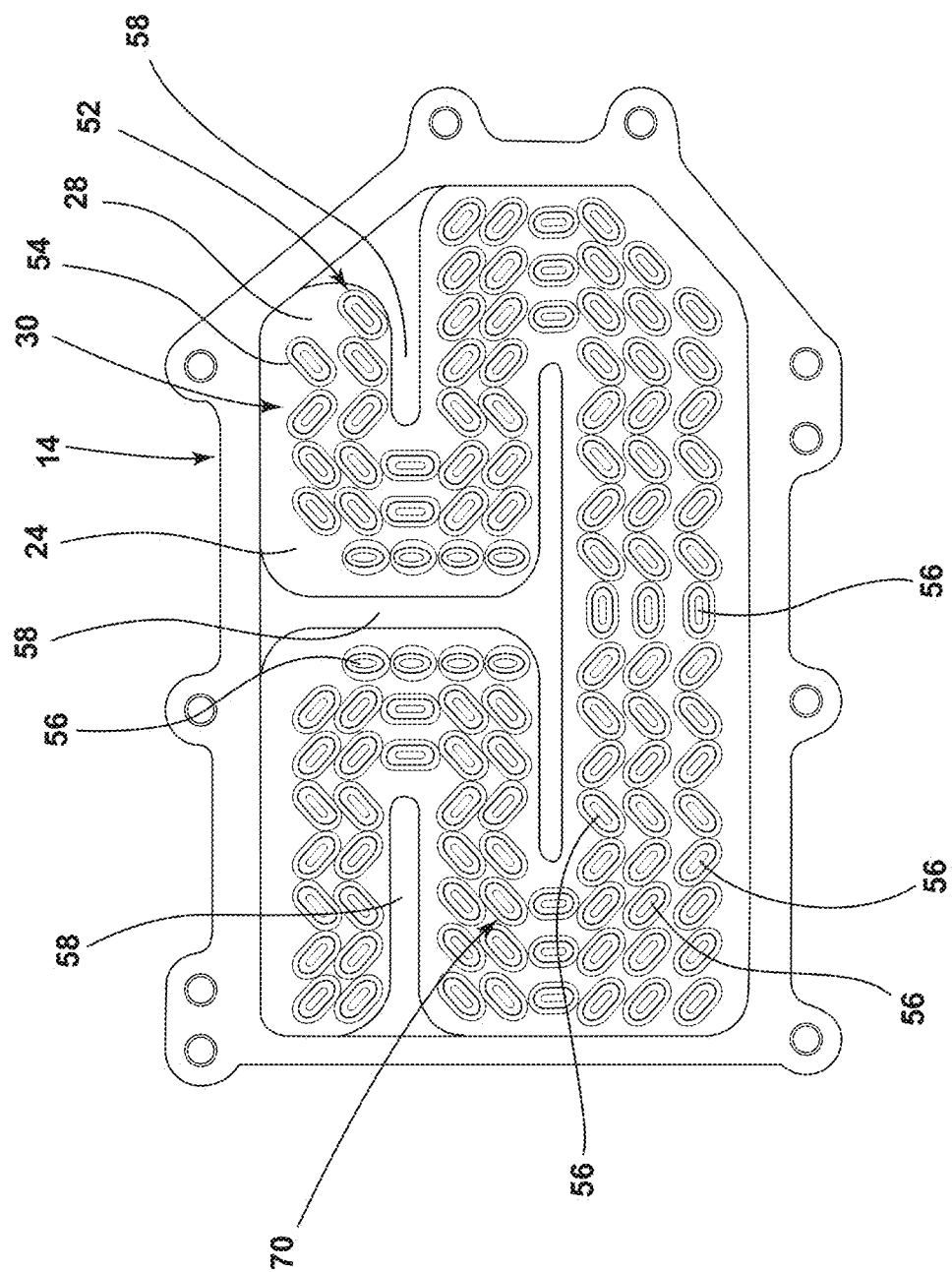
FIG. 8 is an elevational view of a portion of a housing of an electric drive unit that includes a plurality of protrusions and a plurality of baffles.
Figure 9:
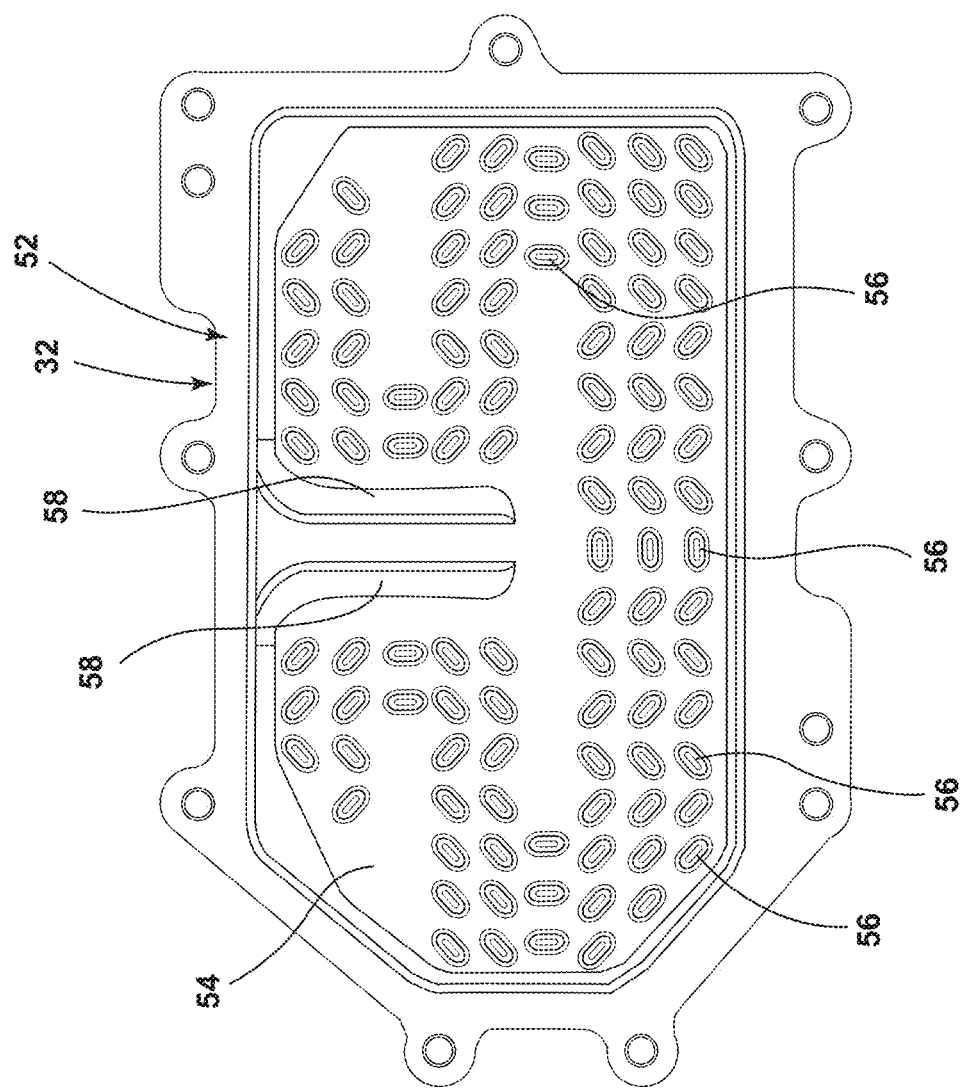
FIG. 9 is an elevational view of a cover of an electric drive unit that includes a plurality of protrusions and a plurality of baffles.
Figure 10:
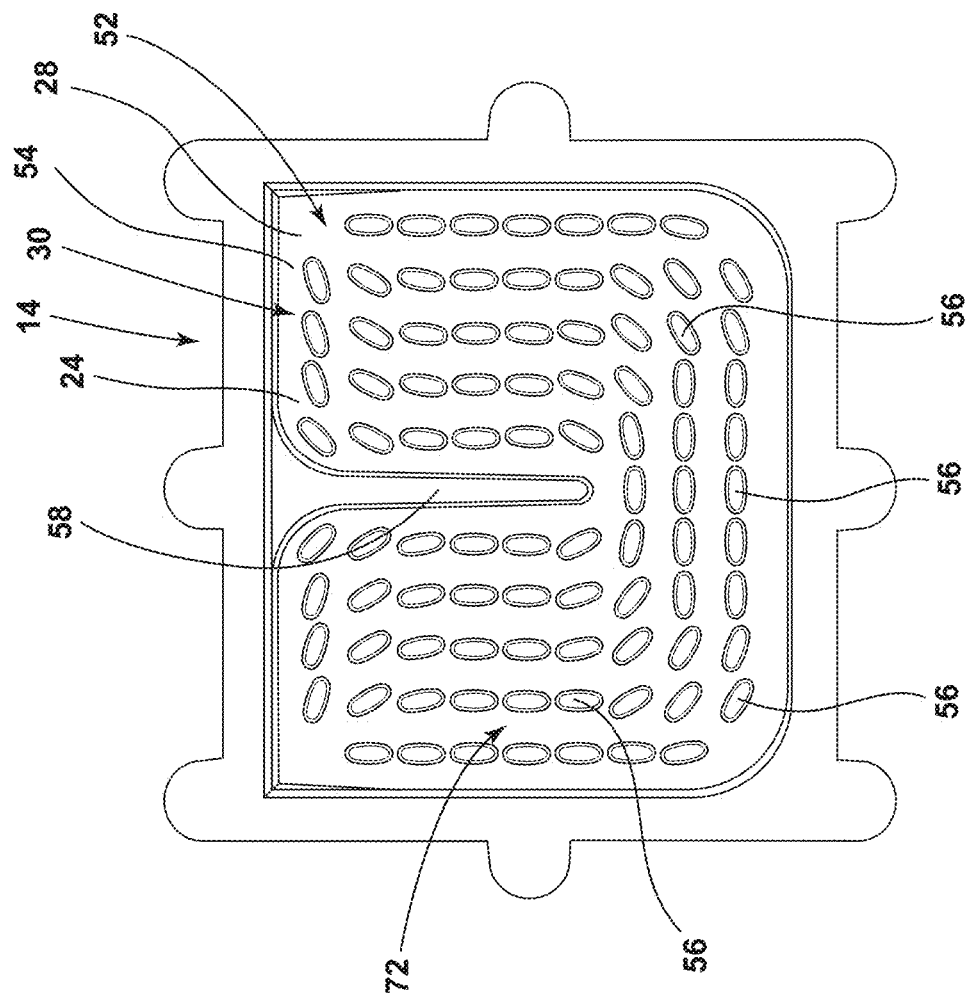
FIG. 10 is an elevational view of an embodiment of a portion of a housing of an electric drive unit that includes a plurality of protrusions.
Figure 11:
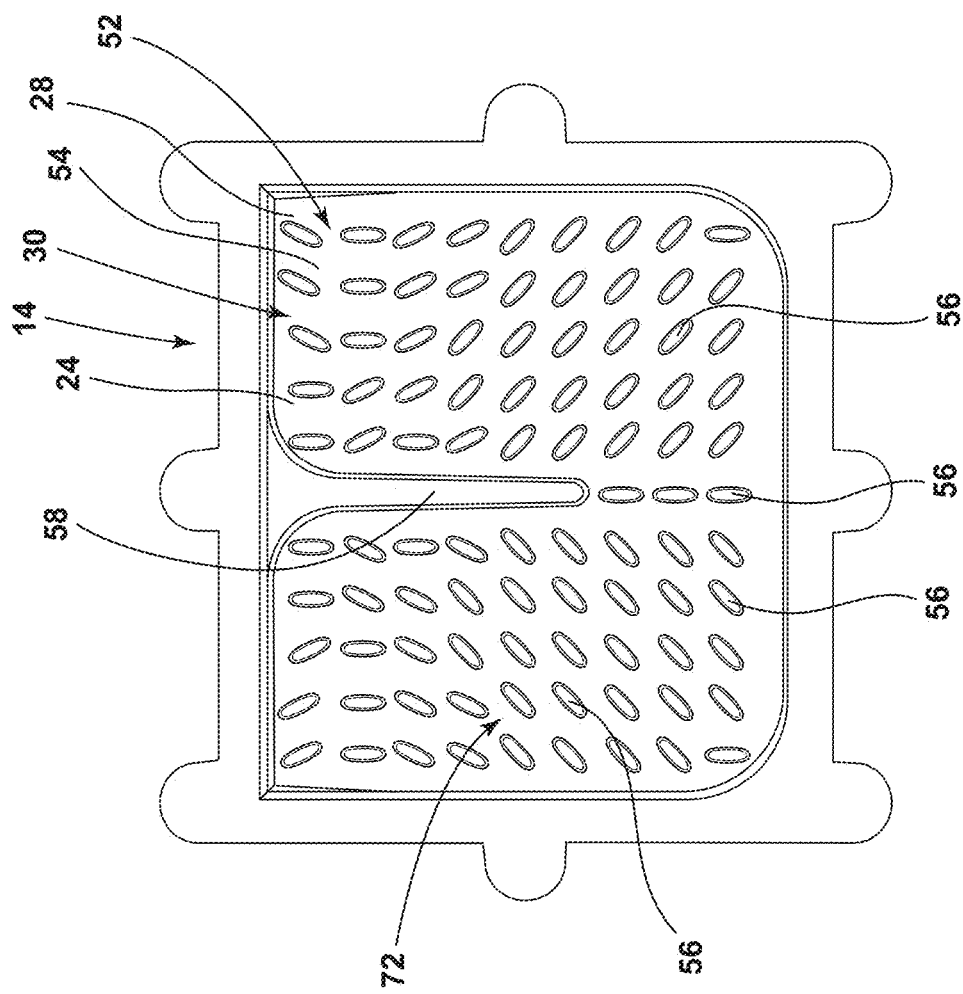
FIG. 11 is an elevational view of an embodiment of a portion of a housing of an electric drive unit that includes a plurality of protrusions.
Figure 12:
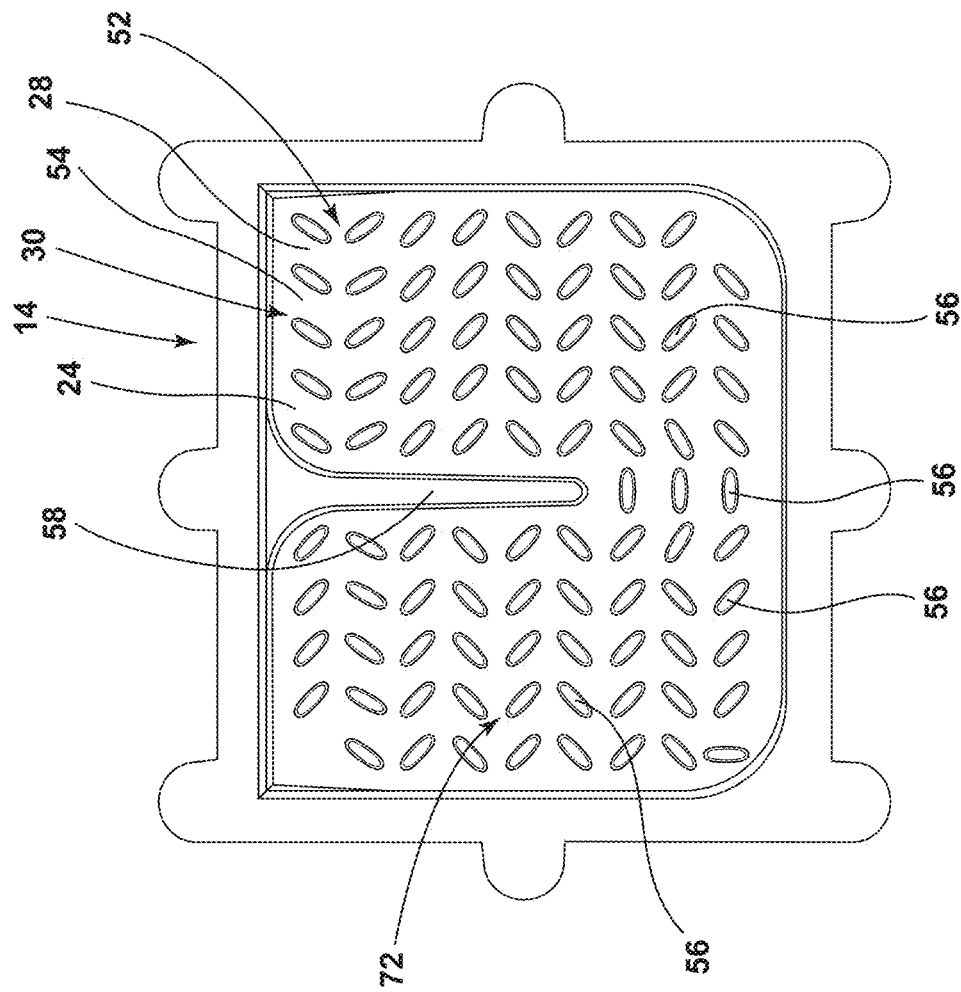
FIG. 12 is an elevational view of an embodiment of a portion of a housing of an electric drive unit that includes a plurality of protrusions.
Figure 13:
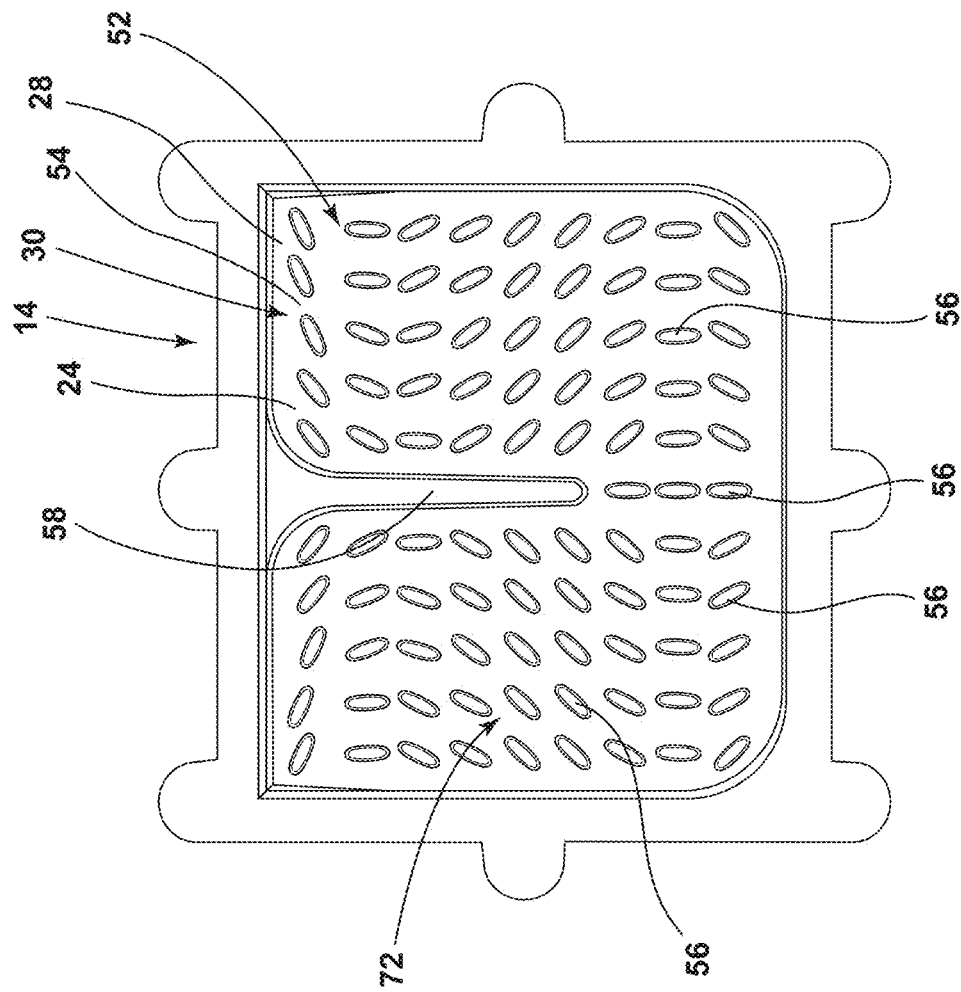
FIG. 13 is an elevational view of an embodiment of a portion of a housing of an electric drive unit that includes a plurality of protrusions.

Referring now to FIGS. 6 and 9, the body 52, in the form of the cover 32, includes a plurality of protrusions 56 extending radially inboard toward the outer surface 28 of the heat exchanging wall portion 24 of the housing 14. As illustrated in FIG. 8, the plurality of protrusions 56 extend to distal ends 62 of the plurality of protrusions 56 of the cover 32. A given protrusion 56 of the plurality of protrusions 56 that extend radially inboard toward the heat exchanging wall portion 24 may have a height that the protrusion 56 extends to the distal end 62 of the protrusion 56, a width, and a length that is greater than the width of the protrusion 56, such that the protrusion 56 of the cover 32 is elongated in the lengthwise direction of the protrusion 56.

In some embodiments, the protrusions 56 of the cover 32 are oriented relative to each other such that the lengthwise directions of the protrusions 56 vary relative to each other to influence the flow of fluid within the fluid chamber 30. For example, in the embodiment illustrated in FIG. 6, the plurality of protrusions 56 of the cover 32 includes first and second protrusions 64, 66. The first protrusion 64 has a height that the first protrusion 64 extends to the distal end 62 of the first protrusion 64, a width, and a length that is greater than the width of the first protrusion 64 such that the first protrusion 64 is elongated in the lengthwise direction of the first protrusion 64. The second protrusion 66 has a height that the second protrusion 66 extends to the distal end 62 of the second protrusion 66, a width, and a length that is greater than the width of the second protrusion 66 such that the second protrusion 66 is elongated in the lengthwise direction of the second protrusion 66. As illustrated in FIG. 6, the first and second protrusions 64, 66 of the cover 32 are oriented such that an angular difference between the lengthwise directions of the first and second protrusions 64, 66 is greater than an angular difference between the heightwise directions of the first and second protrusions 64, 66. The angular difference between the lengthwise directions of the protrusions 56 of the cover 32 may advantageously influence the rate and direction of the flow of fluid within the fluid chamber 30.

Referring now to FIGS. 5, 6, and 9, in various embodiments, the cover 32 includes one or more baffles 58 that extends radially inboard. The one or more baffles 58 can extend radially inboard further than the plurality of protrusions 56 of the cover 32 extend radially inboard, as illustrated in FIG. 6. In some embodiments, the cover 32 includes a plurality of baffles 58 that extend radially inboard, as illustrated in FIG. 6. In some embodiments, one or more baffles 58 of the cover 32 extend radially inboard along one or more baffles 58 formed by the heat exchanging wall portion 24, such that the one or more baffles 58 of the cover 32 and the one or more baffles 58 of the heat exchanging wall portion 24 radially overlap, as illustrated in FIG. 6. In the illustrated embodiment, the housing 14 includes one baffle 58 and the cover 32 includes two baffles 58. The baffle 58 of the housing 14 is positioned axially between two baffles 58 of the cover 32. Collectively, the baffles 58 of the housing 14 and cover 32 may act as a labyrinth to obstruct the flow of fluid within the fluid chamber 30, such that the fluid is directed along the serpentine flow path 70. The cover 32 may further include ribs 74, as illustrated in FIG. 5, for thermal transfer through air convection and conductivity.

Referring now to FIGS. 6, 8, and 9, in some embodiments, wherein the fluid chamber 30 is defined by the outer surface 28 of the heat exchanging wall portion 24 and the cover 32, the plurality of protrusions 56 of the cover 32 may be aligned with the plurality of protrusions 56 of the outer surface 28 of the heat exchanging wall portion 24. For example, as illustrated in FIG. 6, the plurality of protrusions 56 of the cover 32 are aligned with the plurality of protrusions 56 of the outer surface 28 of the heat exchanging wall portion 24 such that the distal ends 62 of the plurality of protrusions 56 of the cover 32 face the distal ends 62 of the plurality of protrusions 56 of the outer surface 28 of the heat exchanging wall portion 24. In the illustrated embodiment, the distal ends 62 of the plurality of protrusions 56 of the cover 32 are in a spaced relationship with the correspondingly aligned plurality of protrusions 56 of the outer surface 28 of the heat exchanging wall portion 24. Further, each aligned pair of protrusions 56 have substantially parallel lengthwise directions, as illustrated in FIG. 6. The cover 32 illustrated in FIG. 9 is configured to be fitted with the embodiment of the housing 14 illustrated in FIG. 8 to form the fluid chamber 30. As shown in FIGS. 8 and 9, the lengthwise direction of each protrusion 56 of the cover 32 is configured to be parallel to a lengthwise direction of each corresponding aligned protrusion 56 of the outer surface 28 of the heat exchanging wall portion 24 of the housing 14.

Figure 14:
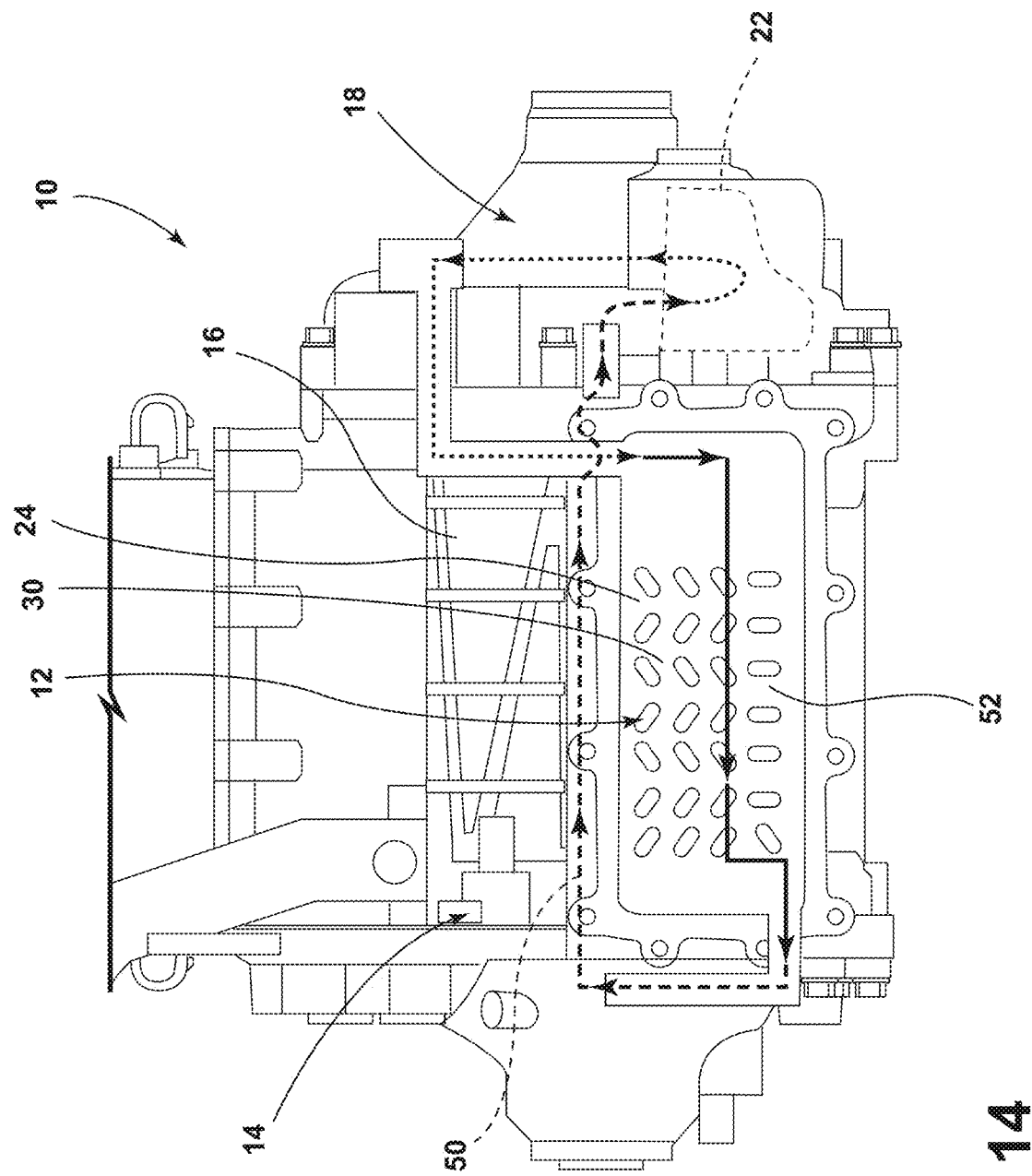
FIG. 14 is an elevational view of an electric drive unit illustrating a flow path of a fluid within the electric drive unit.

In operation of an exemplary embodiment of the electric drive unit 10, the gearbox 20 collects and distributes (via splashing from rotating components of the gearbox) oil from the gearbox sump 22 into the fluid chamber 30, as illustrated in FIG. 14. The baffles 58 and protrusions 56 of the cover 32 and heat exchanging wall portion 24 of the housing 14 direct and slow the flow of the oil within the fluid chamber 30. This allows heat from the relatively hot oil to be sufficiently transferred through the heat exchanging wall portion 24 of the housing 14 to a relatively cool water-glycol mixture within the fluid jacket cavity 46 defined by the inner surface 26 of the heat exchanging wall portion 24. The cooled oil is then routed to the rotor shaft 42 to provide active rotor cooling.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 electric drive unit
12 heat exchanger
14 housing
16 center housing region
18 gearbox housing region
20 gearbox
22 sump
24 heat exchanging wall portion
26 inner surface
28 outer surface
fluid chamber
32 cover
34 electric motor
36 stator
38 rotor
40 stator carrier
42 rotor shaft
44 fluid jacket
46 fluid jacket cavity
48 first fluid
50 second fluid
52 body
54 surface
56 protrusion
58 baffle
60 base
62 distal end
64 first protrusion
66 second protrusion
68 third protrusion
70 serpentine flow path
72 U-shaped flow path
74 ribs

What is claimed is:

1. An electric drive unit, comprising:
an electric motor; and
a housing that houses the electric motor and includes a heat exchanging wall portion that includes an inner surface that defines a fluid jacket cavity for conveying a first fluid that comprises water and an outer surface that is opposite and radially outboard of the inner surface and that defines a fluid chamber for conveying a second fluid that is oil, wherein heat is transferred between the first and second fluids through the heat exchanging wall portion.

2. The electric drive unit of claim 1, wherein the inner surface of the heat exchanging wall portion is axially and circumferentially aligned with the outer surface of the heat exchanging wall portion.

3. The electric drive unit of claim 2, wherein the electric motor includes a rotor and a stator positioned radially outboard of the rotor, and wherein the stator is axially aligned with the heat exchanging wall portion of the housing.

4. The electric drive unit of claim 3, wherein the fluid jacket cavity is defined by the inner surface of the heat exchanging wall portion and a stator carrier, wherein a portion of the stator carrier is axially aligned with and positioned radially outboard of the stator.

5. The electric drive unit of claim 1, wherein heat is transferred to the first fluid from the second fluid through the heat exchanging wall portion.

6. The electric drive unit of claim 1, wherein the outer surface of the heat exchanging wall portion forms a base and a plurality of protrusions extending radially outboard from the base.

7. The electric drive unit of claim 6, further comprising:
a cover mounted to the housing and arranged radially outboard of the heat exchanging wall portion, such that the outer surface of the heat exchanging wall portion and the cover cooperate to define the fluid chamber.

8. The electric drive unit of claim 7, wherein the cover includes a plurality of protrusions that extend radially inboard toward the outer surface of the heat exchanging wall portion of the housing.

9. The electric drive unit of claim 8, wherein the plurality of protrusions of the cover are aligned with the plurality of protrusions of the outer surface of the heat exchanging wall portion, such that distal ends of the plurality of protrusions of the cover face distal ends of the plurality of protrusions of the outer surface of the heat exchanging wall portion.

10. The electric drive unit of claim 7, wherein the outer surface of the heat exchanging wall portion further forms a baffle that extends radially outboard from the base further than the plurality of protrusions of the outer surface of the heat exchanging wall portion extend radially outboard from the base.

11. The electric drive unit of claim 10, wherein the cover includes a baffle that extends radially inboard along the baffle formed by the outer surface of the heat exchanging wall portion.

12. The electric drive unit of claim 6, wherein the plurality of protrusions extending radially outboard from the base comprises:
  a first protrusion having a height that the first protrusion extends outward from the base to a distal end of the first protrusion, a width, and a length that is greater than the width of the first protrusion such that the first protrusion is elongated in the lengthwise direction of the first protrusion; and
  a second protrusion having a height that the second protrusion extends outward from the base to a distal end of the second protrusion, a width, and a length that is greater than the width of the second protrusion such that the second protrusion is elongated in the lengthwise direction of the second protrusion, wherein the first and second protrusions are oriented such that an angular difference between the lengthwise directions of the first and second protrusions is greater than an angular difference between the heightwise directions of the first and second protrusions.

13. An electric drive unit, comprising:
  a body having a surface that defines a fluid chamber, wherein the surface forms a base and a plurality of protrusions extending outward from the base within the fluid chamber, the plurality of protrusions comprising:
    a first protrusion having a height that the first protrusion extends outward from the base to a distal end of the first protrusion, a width, and a length that is greater than the width of the first protrusion such that the first protrusion is elongated in the lengthwise direction of the first protrusion; and
    a second protrusion having a height that the second protrusion extends outward from the base to a distal end of the second protrusion, a width, and a length that is greater than the width of the second protrusion such that the second protrusion is elongated in the lengthwise direction of the second protrusion, wherein the first and second protrusions are oriented such that an angular difference between the lengthwise directions of the first and second protrusions is greater than an angular difference between the heightwise directions of the first and second protrusions; and
    a third protrusion having a height that the third protrusion extends outward from the base to a distal end of the third protrusion, a width, and a length that is greater than the width of the third protrusion such that the third protrusion is elongated in the lengthwise direction of the third protrusion, wherein the third protrusion is oriented such that an angular difference between the lengthwise directions of the first and third protrusions is greater than an angular difference between the heightwise directions of the first and third protrusions, an angular difference between the lengthwise directions of the second and third protrusions is greater than an angular difference between the heightwise directions of the second and third protrusions, and the angular difference between the lengthwise directions of the first and third protrusions is greater than the angular difference between the lengthwise directions of the second and third protrusions.

14. The electric drive unit of claim 13, wherein the body is a housing that houses an electric motor, and the surface is an outer surface of a heat exchanging wall portion of the housing.

15. The electric drive unit of claim 14, wherein the heat exchanging wall portion includes an inner surface opposite the outer surface, wherein the inner surface defines a fluid jacket cavity.

16. The electric drive unit of claim 15, wherein the heat exchanging wall portion is configured to transfer heat to a first fluid that is conveyed within the fluid jacket cavity from a second fluid that is conveyed within the fluid chamber.

17. The electric drive unit of claim 13, wherein the body is a cover coupled to a housing that houses an electric motor, wherein the cover and the housing define the fluid chamber.

18. An electric drive unit, comprising:
  an electric motor;
  a housing that houses the electric motor and includes an outer surface that forms a base and a plurality of protrusions that extend radially outboard from the base to respective distal ends; and
  a cover coupled to the housing and having a plurality of protrusions that are aligned with the plurality of protrusions of the outer surface of the housing, such that the distal ends of the plurality of protrusions that extends from the base face corresponding distal ends of the plurality of protrusions of the cover, wherein the outer surface of the housing and the cover cooperate to define a fluid chamber for conveying fluid.

\* \* \* \* \*